US010009518B2

(12) United States Patent
Tai et al.

(10) Patent No.: US 10,009,518 B2
(45) Date of Patent: Jun. 26, 2018

(54) DETACHABLE AERIAL PHOTOGRAPHIC APPARATUS

(71) Applicant: INDUSTRIAL TECHNOLOGY RESEARCH INSTITUTE, Hsinchu (TW)

(72) Inventors: Wei-Ying Tai, Kaohsiung (TW); Chan-Ru Chang, New Taipei (TW); Chun-Wen Tang, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 300 days.

(21) Appl. No.: 14/971,506

(22) Filed: Dec. 16, 2015

(65) Prior Publication Data
US 2017/0126935 A1 May 4, 2017

(30) Foreign Application Priority Data
Oct. 30, 2015 (TW) .............................. 104135775 A

(51) Int. Cl.
*B64F 1/04* (2006.01)
*H04N 5/225* (2006.01)
(Continued)

(52) U.S. Cl.
CPC ......... *H04N 5/2252* (2013.01); *B64C 39/028* (2013.01); *G05D 1/0011* (2013.01);
(Continued)

(58) Field of Classification Search
CPC ... B64C 2201/20; B64C 25/32; B64C 39/024; B64C 2201/027; B64C 2201/028;
(Continued)

(56) References Cited

U.S. PATENT DOCUMENTS 4,781,642 A * 11/1988 Stanzel .................. A63H 27/12
446/38
7,274,868 B2 9/2007 Segal et al.
(Continued)

FOREIGN PATENT DOCUMENTS

CN 201604796 U 10/2010
CN 104843176 A 8/2015
(Continued)

OTHER PUBLICATIONS

Eisenbeiss, A Mini Unmanned Aerial Vehicle (UAV): System Overview and Image Acquisition, International Workshop on "Processing and Visualization Using High-Resolution Imagery" pp. 1-7.
(Continued)

*Primary Examiner* — Richard G Davis
(74) *Attorney, Agent, or Firm* — Rabin & Berdo, P.C.

(57) ABSTRACT

A detachable aerial photographic apparatus includes a carrier, an aircraft, a take-off delaying device and a trigger. The aircraft includes a main body disposed on the carrier, at least one propeller is pivotally furnished in the main body and a camera disposed on the main body. The take-off delaying device includes a movable member disposed on the carrier and at least one stopper connected to the movable member. The stopper is detachably connected to the aircraft for prevent the aircraft from taking off. The movable member is for detaching the stopper from the aircraft for releasing the aircraft. The trigger is electrically connected to the aircraft and the take-off delaying device. The trigger is for triggering the propeller and the movable member. A first time point when the propeller is triggered by the trigger is earlier than a second time point when the stopper is detached from the aircraft.

19 Claims, 13 Drawing Sheets

(51) Int. Cl.
*G05D 1/00* (2006.01)
*G05D 1/10* (2006.01)
*B64C 39/02* (2006.01)

(52) U.S. Cl.
CPC ............ *G05D 1/101* (2013.01); *H04N 5/2251* (2013.01); *B64C 2201/027* (2013.01); *B64C 2201/042* (2013.01); *B64C 2201/127* (2013.01); *B64C 2201/201* (2013.01)

(58) Field of Classification Search
CPC .......... B64C 2201/08; B64C 2201/084; B64C 2201/088; B64C 2201/108; B64C 2201/123; B64C 2201/146; B64C 2201/127; B64C 2203/00; A63H 27/14; A63H 27/12; B64F 1/04
See application file for complete search history.

(56) References Cited

U.S. PATENT DOCUMENTS

| | | | |
|---|---|---|---|
| 9,016,617 | B2 | 4/2015 | Wang et al. |
| 2007/0228214 | A1 | 10/2007 | Horak |
| 2010/0041311 | A1* | 2/2010 | Reiss ................ A63H 17/26 446/484 |
| 2014/0131510 | A1 | 5/2014 | Wang et al. |
| 2015/0069174 | A1 | 3/2015 | Wang et al. |
| 2016/0011592 | A1* | 1/2016 | Zhang ................ B64C 39/024 701/2 |
| 2016/0207617 | A1* | 7/2016 | Sada-Salinas ............ B64F 1/04 |
| 2017/0021923 | A1* | 1/2017 | Fisher ................ B64C 29/02 |
| 2017/0158352 | A1* | 6/2017 | von Flotow ............ B64F 1/04 |
| 2017/0176987 | A1* | 6/2017 | Deng ................ G05D 1/0038 |

FOREIGN PATENT DOCUMENTS

| | | |
|---|---|---|
| KR | 100929260 B1 | 12/2009 |
| TW | 581707 B | 4/2004 |
| TW | 200818884 A | 4/2008 |
| TW | M395641 U | 1/2011 |
| TW | M412926 U | 10/2011 |
| TW | 201242842 A | 11/2012 |
| TW | 201317544 A | 5/2013 |
| TW | I404654 B | 8/2013 |
| TW | M460835 U | 9/2013 |
| TW | M465585 U | 11/2013 |
| TW | I444593 B | 7/2014 |
| TW | M489676 U | 11/2014 |
| TW | M491501 U | 12/2014 |
| TW | I476365 B | 3/2015 |
| TW | 201512039 A | 4/2015 |
| TW | D168001 | 5/2015 |

OTHER PUBLICATIONS

Zischinsky et al., Application of a new Model Helicopter System in Architectural Photogrammetry, International Archives of Photogrammetry and Remote Sensing, vol. XXXIII, Supplement B5, Amsterdam 2000, pp. 177-182.
Lee et al., Points-of-Interest Mining from People's Photo-Taking Behavior, 2012 IEEE, pp. 3129-3136.
Quigley et al., Target Acquisition, Localization, and Surveillance Using a Fixed-Wing Mini-UAV and Gimbaled Camera, International Conference on Robotics and Automation, Apr. 2005 IEEE, pp. 2600-2605.
Pfeil et al., Throwable panoramic ball camera, SIGGRAPH Asia 2011, Dec. 12-15, 2011, p. 1.
Wang et al., Research and applications of controlling remote control unmanned aerial vehicles, Feb. 2010, pp. 110-114.
Taiwan Patent Office, Office Action, Patent Application Serial No. TW104135775, dated Jul. 7, 2016, Taiwan.

* cited by examiner

DETACHABLE AERIAL PHOTOGRAPHIC APPARATUS

CROSS-REFERENCE TO RELATED APPLICATIONS

This non-provisional application claims priority under 35 U.S.C. § 119(a) on Patent Application No(s). 104135775 filed in Taiwan, R.O.C. on Oct. 30, 2015, the entire contents of which are hereby incorporated by reference.

TECHNICAL FIELD

The disclosure relates to a detachable aerial photographic apparatus.

BACKGROUND

The radio-controlled aircraft (RC aircraft) has become popular in recent years. There are more and more related groups, leagues, shows or competitions where people are enthusiastic to participate. With the development of technology, the radio-controlled aircraft can fly with a camera for shooting aerial footage and photos. In general, there have two main types of conventional radio-controlled aircraft. One is the radio-controlled helicopter in which lift and thrust are supplied by spinning or tilting two propellers (blades); and the other one is the radio-controlled multicopter which has more propellers than the radio-controlled helicopter, and control of motion is achieved by varying the rotational speed of each propeller to change the thrust and torque produced by each.

SUMMARY

One embodiment of the disclosure provides a detachable aerial photographic apparatus which includes a carrier, an aircraft, a take-off delaying device and a trigger. The aircraft includes a main body, at least one propeller and a camera. The main body is detachably disposed on the carrier. The propeller is pivotally furnished in the main body. The camera is disposed on the main body. The take-off delaying device includes a movable member and at least one stopper. The movable member is movably disposed on the carrier. The stopper is connected to the movable member. The stopper is detachably connected to the aircraft for preventing the aircraft from taking off. The movable member is configured for detaching the at least one stopper from the aircraft for releasing the aircraft. The trigger is electrically connected to the aircraft and the take-off delaying device. The trigger is configured for triggering the propeller and the movable member. A first time point when the propeller is triggered by the trigger is earlier than a second time point when the stopper is detached from the aircraft.

BRIEF DESCRIPTION OF THE DRAWINGS

The present invention will become better understood from the detailed description given hereinbelow and the accompanying drawings which are given by way of illustration only and thus are not limitative of the present invention and wherein:

FIG. 7A and FIG. 7B are two cross-sectional views of the detachable aerial photographic apparatus when the pressed member of the trigger is being pressed for a while.

DETAILED DESCRIPTION

Figure 1:
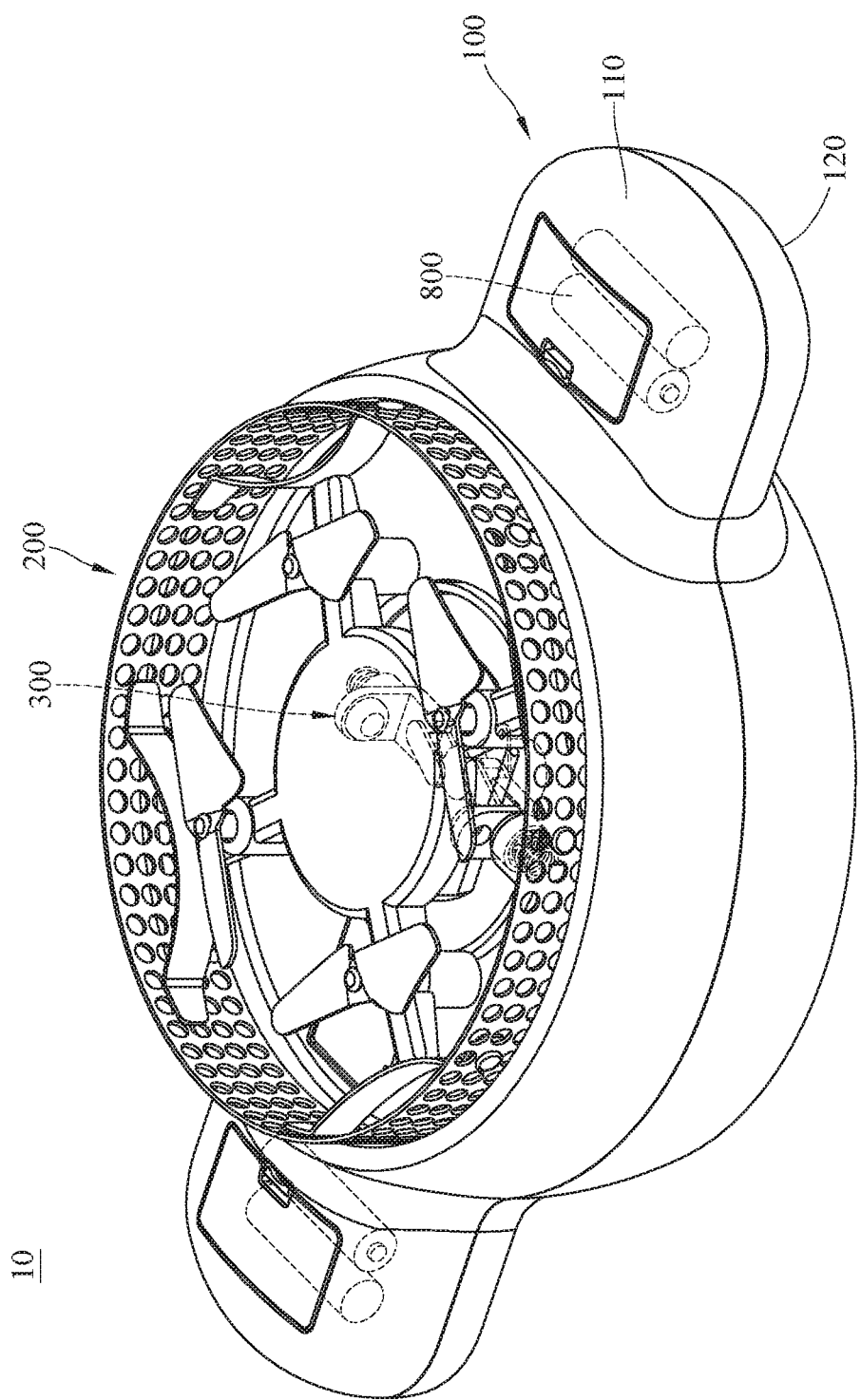
FIG. 1 is a perspective view of a detachable aerial photographic apparatus according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
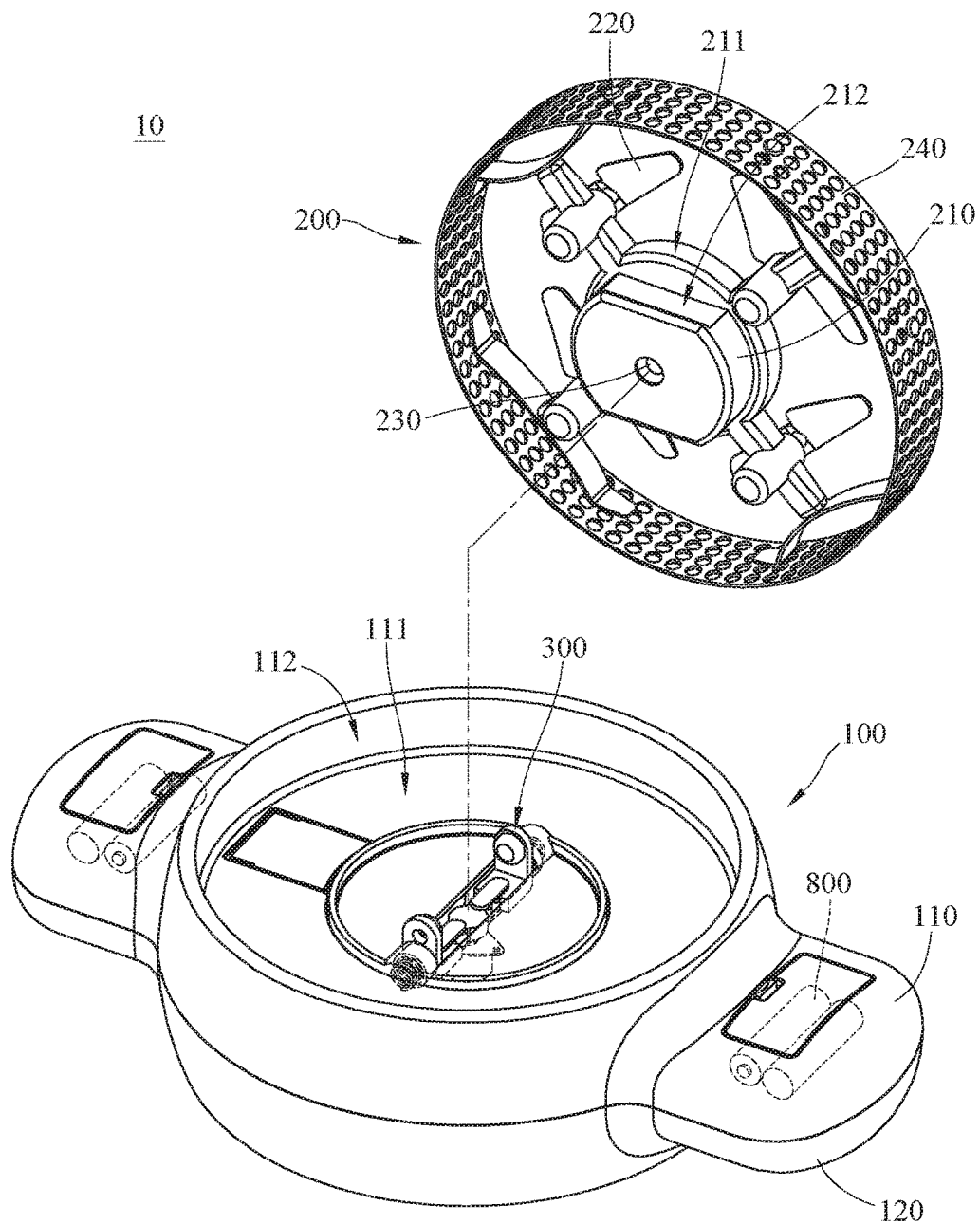
FIG. 2 is an exploded view of the detachable aerial photographic apparatus shown in FIG. 1.
Figure 3:
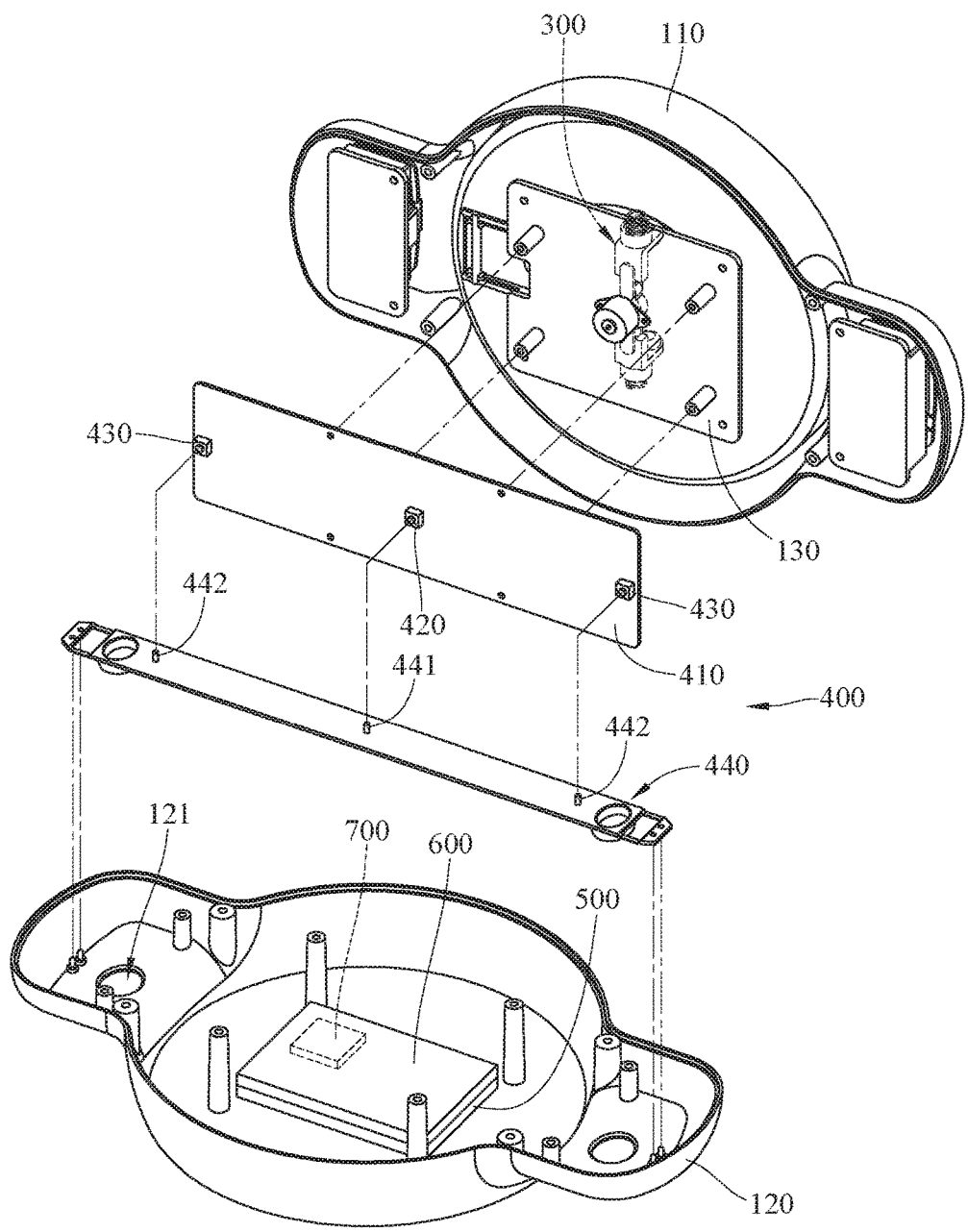
FIG. 3 is an exploded view of a carrier and a trigger shown in FIG. 1.

Please refer to FIG. 1 to FIG. 3. FIG. 1 is a perspective view of a detachable aerial photographic apparatus according to a first embodiment of the disclosure. FIG. 2 is an exploded view of the detachable aerial photographic apparatus shown in FIG. 1. FIG. 3 is an exploded view of a carrier and a trigger shown in FIG. 1.

This embodiment provides a detachable aerial photographic apparatus 10 which includes a carrier 100, an aircraft 200, a take-off delaying device 300 and a trigger 400.

Figure 5A:
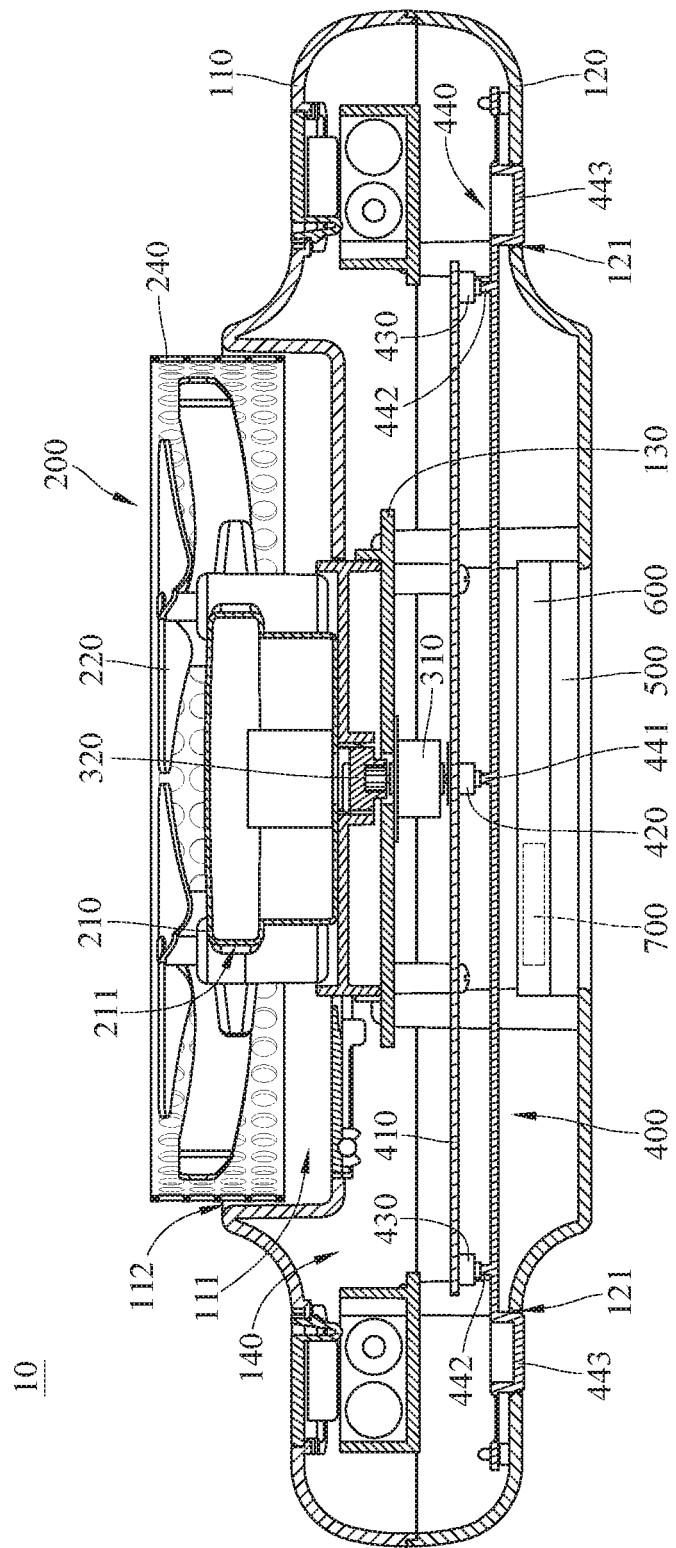
FIG. 5A is a cross-sectional view of the detachable aerial photographic apparatus shown in FIG. 1.

The carrier 100 is made of, for example, plastic or metal. The carrier 100 includes a first shell 110, a second shell 120 and a partition 130. The second shell 120 disposed on the first shell 110 forms an accommodation space 140 (as shown in FIG. 5A). The partition 130 is located in the accommodation space 140. In addition, the first shell 110 has a depression 111 and an opening 112. The depression 111 is connected to the accommodation space 140, and the opening 112 is corresponding to the depression 111. The second shell 120 has a plurality of through-holes 121 connected to the accommodation space 140.

The aircraft 200 includes a main body 210, a plurality of propellers 220, a camera 230 and a buffering ring 240. The main body 210 detachably disposed in the accommodation space 140 of the carrier 100 is able to be detached from the carrier 100 through the opening 112. The main body 210 has an annular surface 211 and a recess 212. The recess 212 is formed on the annular surface 211. The propellers 220, also called blades, are pivotally furnished in the main body 210. In this embodiment, the aircraft 200 is a quadcopter having four propellers 220, but the present disclosure is not limited thereto. In other embodiments, the aircraft 200 may be an octocopter having eight propellers 220 or other types of multicopter having three or over five propellers. The camera 230 is disposed on the main body 210 for taking photos or recording videos. The buffering ring 240 connected to the main body 210 surrounds the main body 210. The buffering ring 240 is configured for absorbing impact applied to the main body 210.

In this embodiment, the quantity of the recess 212 is one, and the recess 212 surrounds the main body 210, but the present disclosure is not limited thereto. In other embodiments, the quantity of the recess is two, and the two recesses are located on two sides of the main body which are opposite to each other.

Figure 4A:
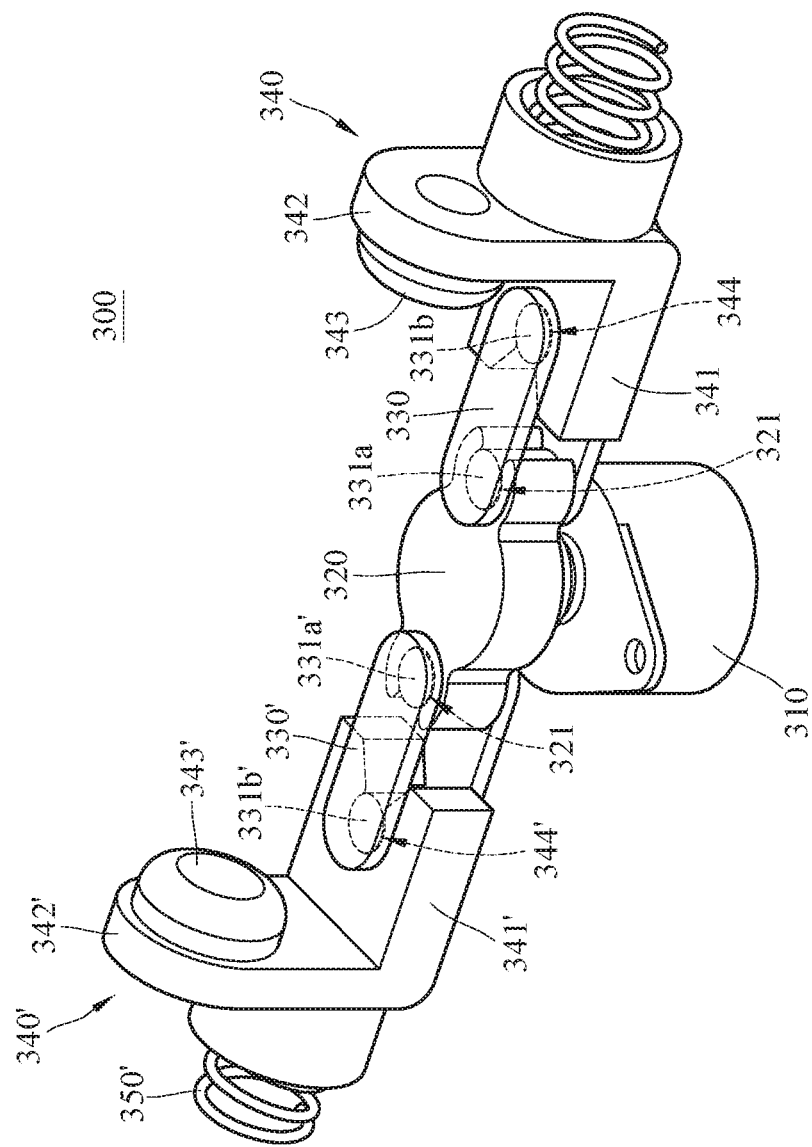
FIG. 4A is a perspective view of a take-off delaying device shown in FIG. 1.
Figure 4B:
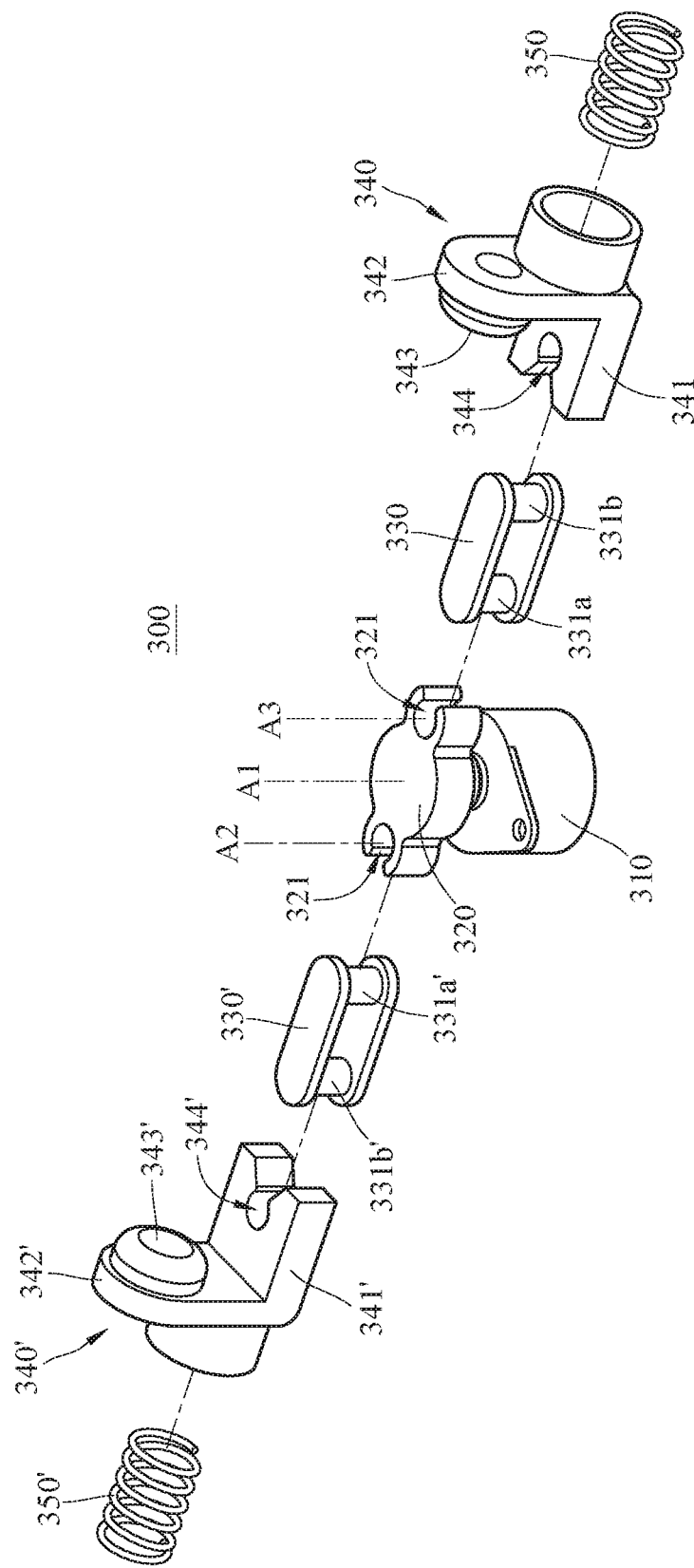
FIG. 4B is an exploded view of the take-off delaying device shown in FIG. 4A.
Figure 5B:
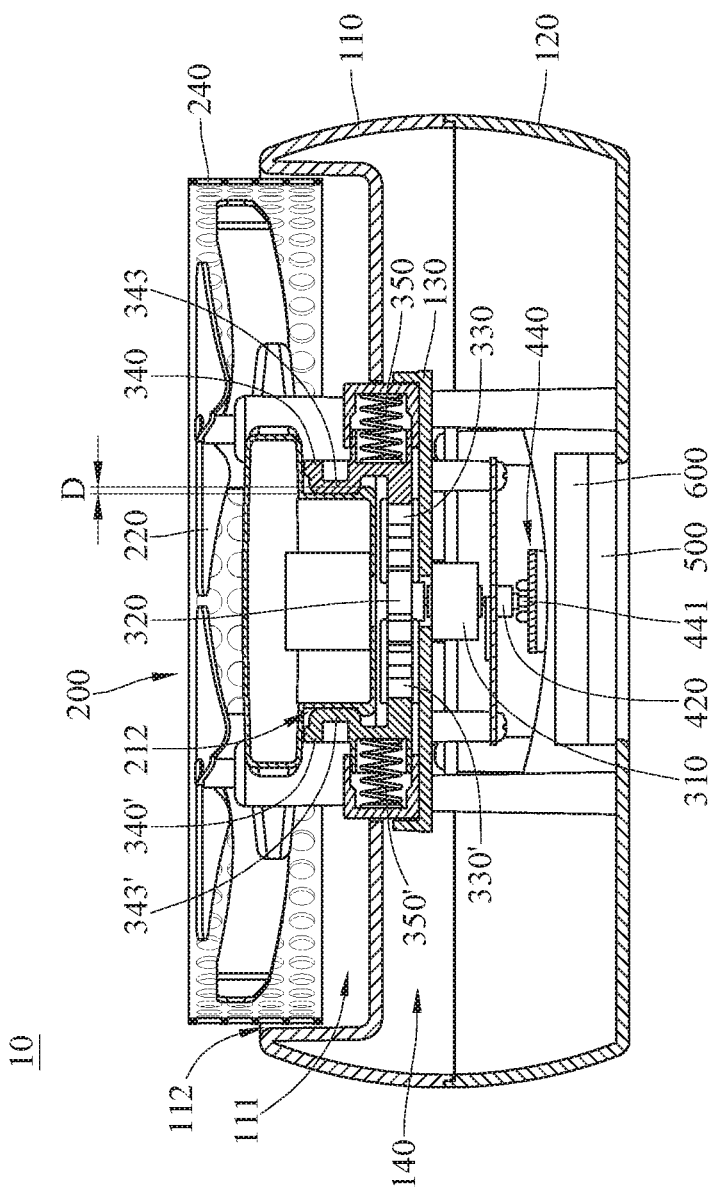
FIG. 5B is the other cross-sectional view of the detachable aerial photographic apparatus shown in FIG. 1.

Please refer to FIG. 4A to FIG. 5B. FIG. 4A is a perspective view of a take-off delaying device shown in FIG. 1. FIG. 5A is a cross-sectional view of the detachable aerial photographic apparatus shown in FIG. 1. FIG. 5B is the other cross-sectional view of the detachable aerial photographic apparatus shown in FIG. 1.

The take-off delaying device 300 includes a motor 310, a movable member 320, a first linkage 330, a second linkage 330', a first stopper 340 and a second stopper 340'. The motor 310 is disposed on the partition 130 of the carrier 100. The movable member 320 disposed on the motor 310 has a central axis A1 which is the same as an axis of a shaft of the motor 310. The movable member 320 is driven by the motor 310, so that the movable member 320 is rotatable relative to the carrier 100. The movable member 320 has two pivot grooves 321 respectively located at two sides of the movable member 320 which are opposite to each other. The first stopper 340 has a pivot groove 344. The second stopper 340' has a pivot groove 344'. A central axis A2 of one of the pivot grooves 321 and a central axis A3 of the other pivot groove 321 are spaced apart from the central axis A1 of the movable member 320. The first linkage 330 has a pivoting protrusion 331a and a pivoting protrusion 331b respectively located at two sides of the first linkage 330 which are opposite to each other. The second linkage 330' has a pivoting protrusion 331a' and a pivoting protrusion 331b' respectively located at two sides of the second linkage 330' which are opposite to each other. The pivoting protrusion 331a and the pivoting protrusion 331a' are pivoted to the two pivot grooves 321, respectively. The pivoting protrusion 331b and the pivoting protrusion 331b' are pivoted to the pivot groove 344 of the first stopper 340 and the pivot groove 344' of the second stopper 340', respectively. When the motor 310 rotates the movable member 320, the movable member 320 drives the first linkage 330 and the second linkage 330' to move the first stopper 340 and the second stopper 340' to be alternatively close to or away from each other. For example, the movable member 320 rotates along a direction so as to drive the first stopper 340 to move close to the second stopper 340', and the movable member 320 rotates along an inverse direction so as to drive the first stopper 340 to move away from the second stopper 340'.

In details, the first stopper 340 includes a pivotal portion 341, a connecting portion 342 and an engaging protrusion 343. The pivotal portion 341 and the engaging protrusion 343 are located on the same side of the connecting portion 342, as shown in FIG. 4A. Both of the pivotal portion 341 and the engaging protrusion 343 protrude from the connecting portion 342. The pivot groove 344 of the first stopper 340 is formed on the pivotal portion 341 of the first stopper 340. The pivotal portion 331b of the first linkage 330 is pivoted to the pivot groove 344 of the first stopper 340. The second stopper 340' includes a pivotal portion 341', a connecting portion 342' and an engaging protrusion 343'. The pivotal portion 341' and the engaging protrusion 343' are located on the same side of the connecting portion 342', as shown in FIG. 4. Both of the pivotal portion 341' and the engaging protrusion 343' protrude from the connecting portion 342'. The pivot groove 344' of the second stopper 340' is formed on the pivotal portion 341' of the second stopper 340'. The pivoting protrusion 331b' of the second linkage 330' is pivoted to the pivot groove 344' of the second stopper 340'.

The operation of the take-off delaying device 300 is described below. The motor 310 is able to rotate the movable member 320. When the motor 310 rotates the movable member 320, the movable member 320 drives the linkage 330 and linkage 330' to move the first stopper 340 and the second stopper 340' to be alternatively close to or away from each other. In details, when the first stopper 340 and the second stopper 340' are close to each other, each of the engaging protrusion 343 of the first stopper 340 and the engaging protrusion 343' of the second stopper 340' protrudes into the recess 212 of the aircraft 200 to a depth D, allowing the take-off delaying device 300 to be engaged with the aircraft 200 for preventing the aircraft 200 from taking off. When the first stopper 340 and the second stopper 340' are away from each other, the engaging protrusion 343 of the first stopper 340 and the engaging protrusion 343' of the second stopper 340' are disengaged from (detached from) the recess 212, thereby disengaging the aircraft 200, so that the aircraft 200 is able to take-off.

In addition, in this embodiment, the take-off delaying device 300 further includes a first elastic member 350 and a second elastic member 350'. The first elastic member 350 is compressed between the first stopper 340 and the carrier 100. The second elastic member 350' is compressed between the second stopper 340' and the carrier 100. The first elastic member 350 and the second elastic member 350' keep forcing the first stopper 340 and the second stopper 340' to be close to each other, so that the first stopper 340 and the second stopper 340' are able to normally engage with the aircraft 200 before the motor 310 move the movable member 320.

In addition, in this embodiment, the first stopper 340 and the second stopper 340' are moved relative to the carrier 100 due to the rotation of the movable member 320 driven by the motor 310, but the present disclosure is not limited thereto. In other embodiments, the two stoppers are able to be moved relative to the carrier by a fluid pressure cylinder sliding the movable member.

Moreover, in this embodiment, the aircraft 200 is prevented from taking off due to the engagement between the two stoppers (the first stopper 340 and the second stopper 340') and the aircraft 200, but the present disclosure is not limited thereto. In other embodiments, the two stoppers may clamp the aircraft to prevent the aircraft from taking off.

The trigger 400 is electrically connected to the aircraft 200 and the take-off delaying device 300. The trigger 400 is configured for triggering the propellers 220 and the motor 310. In details, the trigger 400 includes a circuit board 410, a first switch 420, a second switch 430 and a pressed member 440. The circuit board 410 is disposed on the partition 130. The first switch 420 and the second switch 430 are disposed on a side of the circuit board 410 close to the second shell 120, and electrically connected to the aircraft 200 and the motor 310 of the take-off delaying device 300, respectively. The pressed member 440 has a first pressed protrusion 441, two second pressed protrusions 442 and two buttons 443. The pressed member 440 is slidably disposed on the second shell 120 of the carrier 100. The two buttons 443 penetrate through the through-holes 121 of the second shell 120, respectively. The first pressed protrusion 441 is able to be close to the first switch 420 by being pressed, and the two second pressed protrusions 442 are able to be close to the second switch 430 by being pressed.

In this embodiment, the first switch 420 and the aircraft 200 are electrically connected to each other through a wireless connection, and the second switch 430 and the motor 310 of the take-off delaying device 300 are electrically connected to each other through a wired connection, but the disclosure is not limited thereto. In other embodiments, both of the connection between the first switch 420 and the aircraft 200 and the connection between the second switch 430 and the motor 310 are wireless connections. In yet another embodiment, both of the connection between the first switch 420 and the aircraft 200 and the connection between the second switch 430 and the motor 310 are wired connections.

In this embodiment, the detachable aerial photographic apparatus 10 further includes a display module 500, a computing module 600, a Bluetooth module 700 and a power module 800. The display module 500 is disposed on the second shell 120 of the carrier 100. A screen of the display module 500 exposed to the outside is configured for displaying image. For example, the screen is able to show photos taken by the camera 230. The computing module 600 is disposed on the carrier 100 and electrically connected to the display module 500. In addition, an operating system is installed on the computing module 600 so that the user is able to interact with the computing module 600. The Bluetooth module 700 is disposed on the carrier 100 and electrically connected to the computing module 600, so that the computing module 600 is able to transfer data to the aircraft 200. The power module 800 is disposed on the carrier 100 and electrically connected to the display module 500, the computing module 600, the Bluetooth module 700 and the motor 310 for providing power. In addition, the carrier 100 has a game card slot (not shown) for a game card slot to plug, thus the carrier is configured to be a game-console.

Figure 6A:
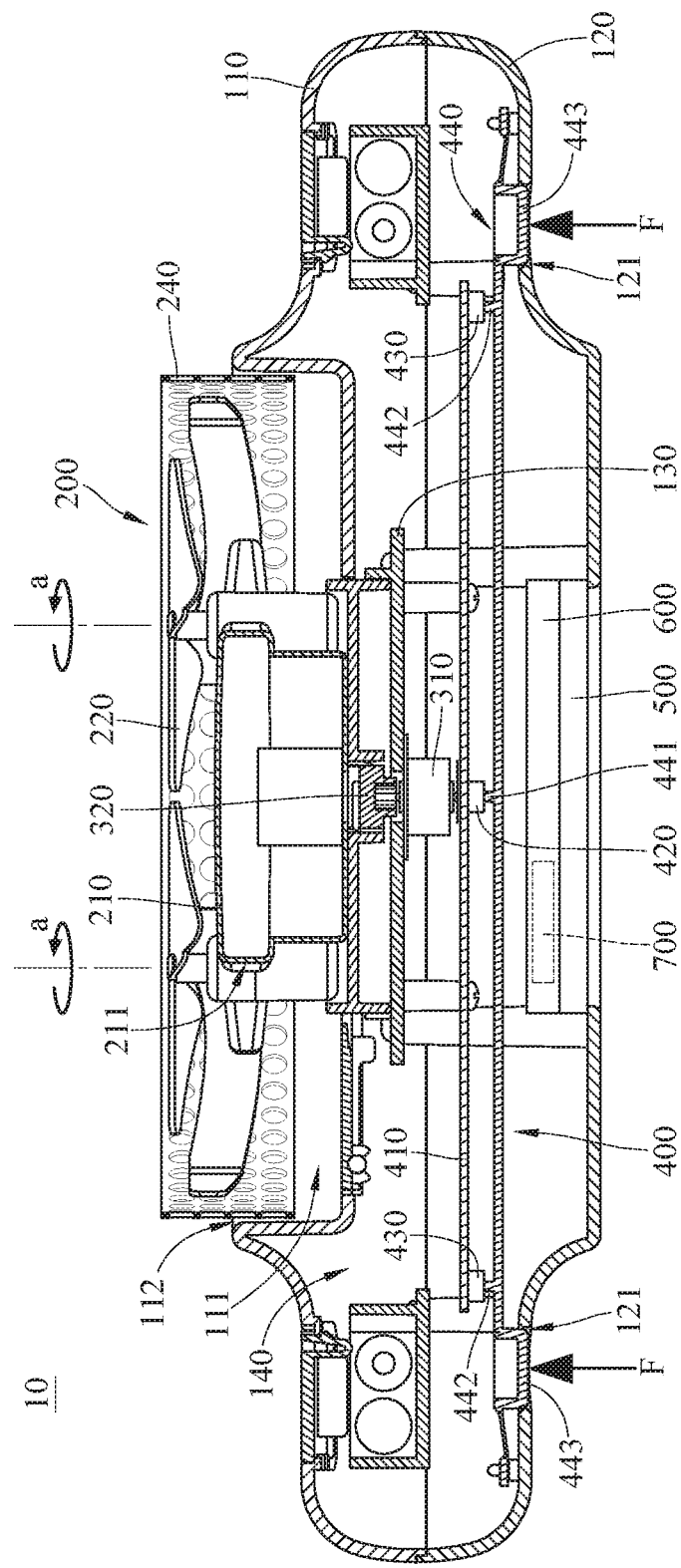
FIG. 6A and FIG. 6B are two cross-sectional views of the detachable aerial photographic apparatus when a pressed member of the trigger is being pressed.
Figure 6B:
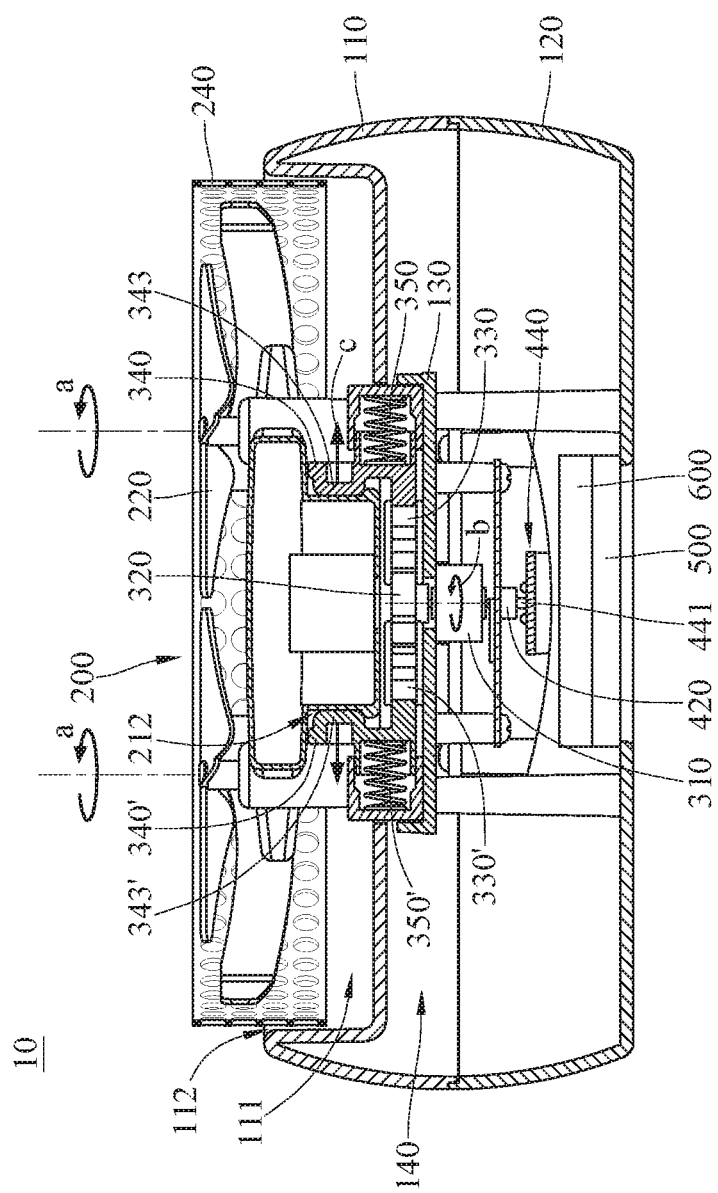
Figure 7A:
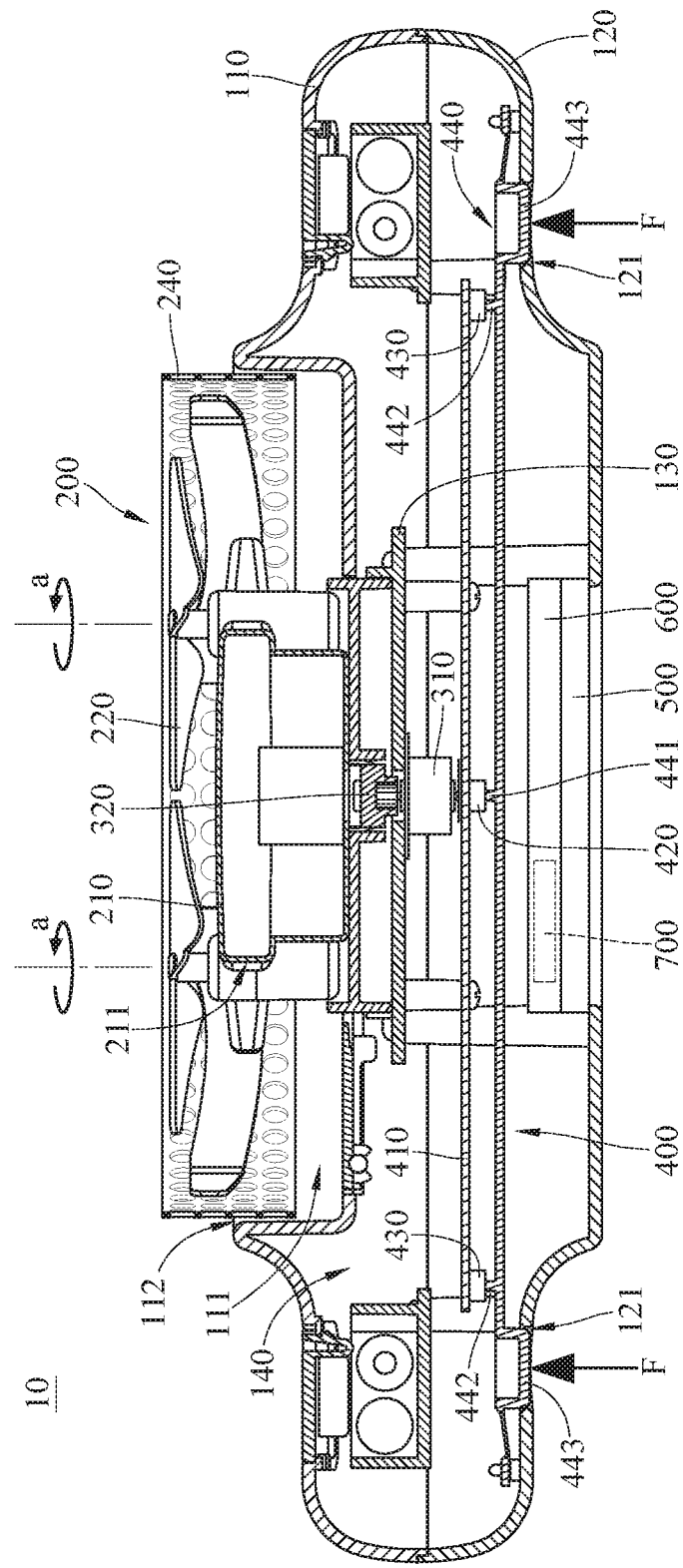
Figure 7B:
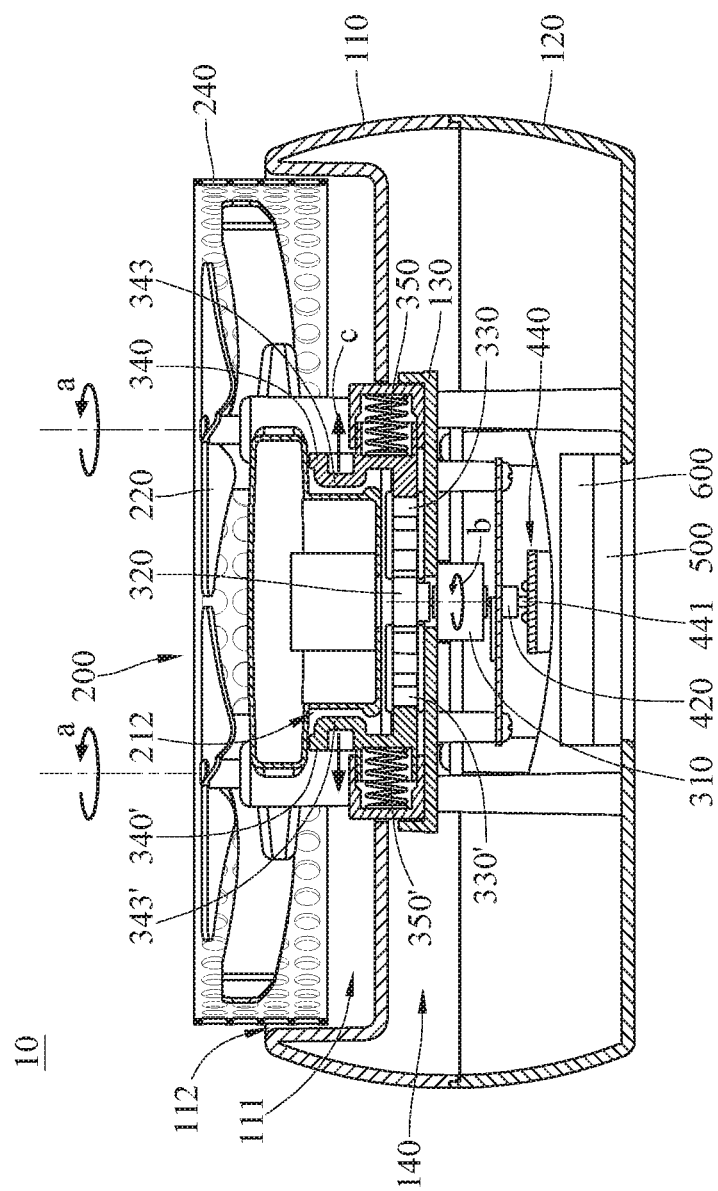

Please refer to FIG. 5A to FIG. 7B. FIG. 6A and FIG. 6B are two cross-sectional views of the detachable aerial photographic apparatus when a pressed member of the trigger is being pressed. FIG. 7A and FIG. 7B are two cross-sectional views of the detachable aerial photographic apparatus when the pressed member of the trigger is being pressed for a while.

As shown in FIG. 5A and FIG. 5B, the first stopper 340 and the second stopper 340' are not driven by the motor 310 yet, so that the engaging protrusion 343 of the first stopper 340 and the engaging protrusion 343' of the second stopper 340' are close to each other to engage with the recess 212 of the aircraft 200. Then, as shown in FIG. 6A and FIG. 6B, when the user press the two buttons 443 of the pressed member 440 (as the force F shown in FIG. 6A), the first pressed protrusion 441 and the two second pressed protrusions 442 are closed to and simultaneously press against the first switch 420 and the two second switches 430, respectively. When the first switch 420 and the second switches 430 are pressed, the propellers 220 of the aircraft 200 and the motor 310 of the take-off delaying device 300 are trigged. Hence, each of the propellers 220 spins in the direction of arrow a and generates a lift force. The shaft of the motor 310 spins in the direction of arrow b, and thereby moving the first stopper 340 in the direction of arrow c and the second stopper 340' in the direction of arrow d, which makes the first stopper 340 and the second stopper 340' to be away from each other.

FIG. 7A and FIG. 7B show that the two buttons 443 of the pressed member 440 are being pressed for a while, thus the engaging protrusion 343 of the first stopper 340 and the engaging protrusion 343' of the second stopper 340' are completely disengaged from the recess 212, and the aircraft 200 has stored enough energy to take off and to fly in a stable way.

According to the aforementioned operation steps, in this embodiment, the propellers 220 are triggered by the trigger 400 at a first time point, and the stoppers 340 and 340' are detached from the recess 212 of the aircraft 200 at a second time point. The first time point is earlier than the second time point. Since the propellers 220 have insufficient power to lift the aircraft 200 at the beginning, the first stopper 340 and the second stopper 340' are engaged with the aircraft 200 for preventing the aircraft 200 from taking off with insufficient lift force. If the aircraft 200 takes off with insufficient lift force, the aircraft 200 will be unstable, making the aircraft 200 easily fall before climbing above the desired altitude. Accordingly, because of the engagement between the two stoppers (the first stopper 340 and the second stopper 340') and the aircraft 200, the take-off time of the aircraft 200 is postponed, so that the aircraft 200 has sufficient time to generate enough energy (e.g. lift force) to fly. In other words, the stoppers 340 and 340' are disengaged from the aircraft 200 until the aircraft 200 has enough energy. As a result, it will become easier to operate the detachable aerial photographic apparatus 10 and thereby making the aircraft 200 to fly stably.

Furthermore, a time difference between the first time point and the second time point is controlled by a rotational speed of the motor 310. In details, the rotational speed of the motor 310 is proportional to the rate of change in the depth D. Thus, for the take-off delaying device 300, a time required from the beginning to completely releasing the aircraft 200 is able to be controlled by calculating the relation between the depth D and the rotational speed of the motor 310. For example, in a case that the trigger 400 triggers the aircraft 200 and the take-off delaying device 300 simultaneously, a time required for the take-off delaying device 300 to completely releasing the aircraft 200 is the same as a time difference between the first time point and the second time point. For another example, in a case that the trigger 400 firstly triggers the aircraft 200 at a first starting time point and then triggers the take-off delaying device 300 at a second starting time point, a time difference between the first time point and the second time point is the same as a sum of a time for the take-off delaying device 300 from the beginning to completely releasing the aircraft 200 and a time difference between the first starting time point and the second starting time point. That is, when the trigger 400 triggers the aircraft 200 at the first starting time point, the propellers 220 rotates for generating energy while the stoppers 340 and 340' of the take-off delaying device 300 keep engaging with the aircraft 200. When the trigger 400 the take-off delaying device 300 at a second starting time point, the take-off delaying device 300 begins to release the aircraft 200. In short, there is an additional time difference between triggering the aircraft 200 and triggering the take-off delaying device 300 when the aircraft 200 is triggered earlier than the take-off delaying device 300.

Figure 8:
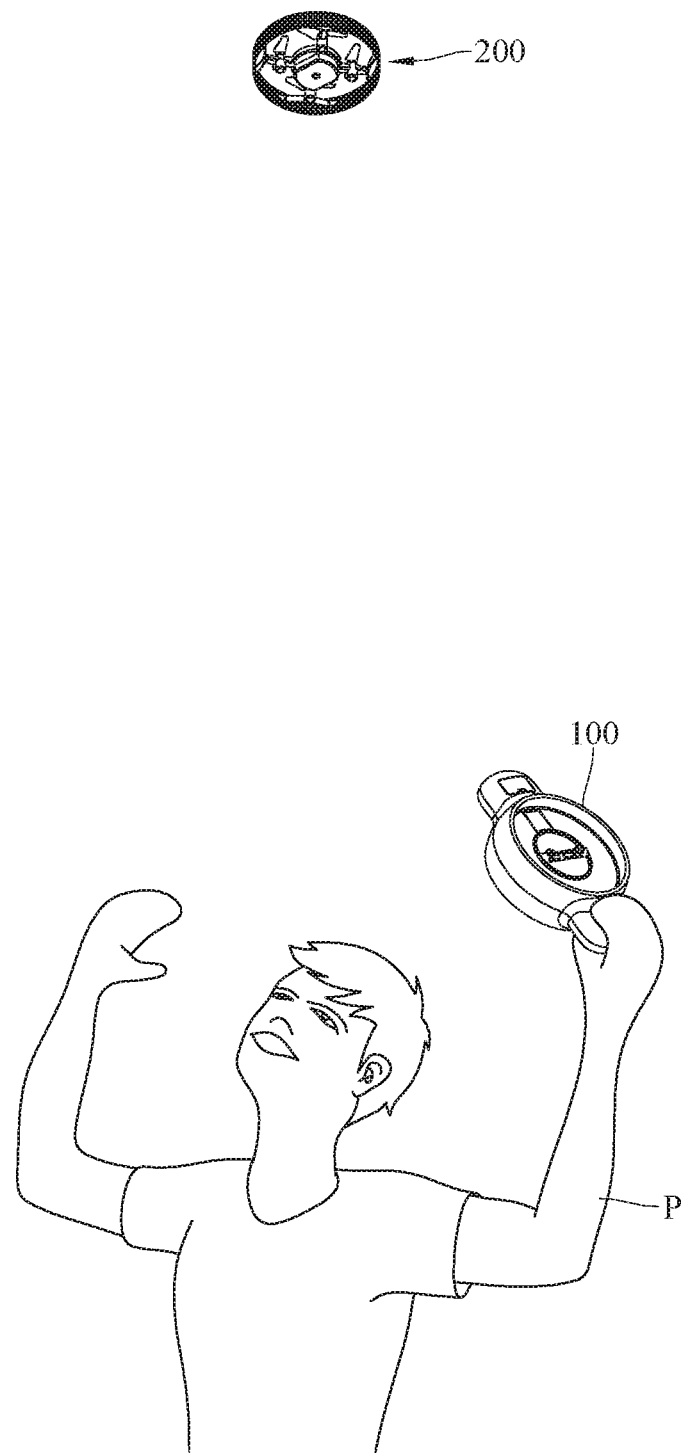
FIG. 8 and FIG. 9 are two scenarios that a user interacts with the detachable aerial photographic apparatus shown in FIG. 1.
Figure 9:
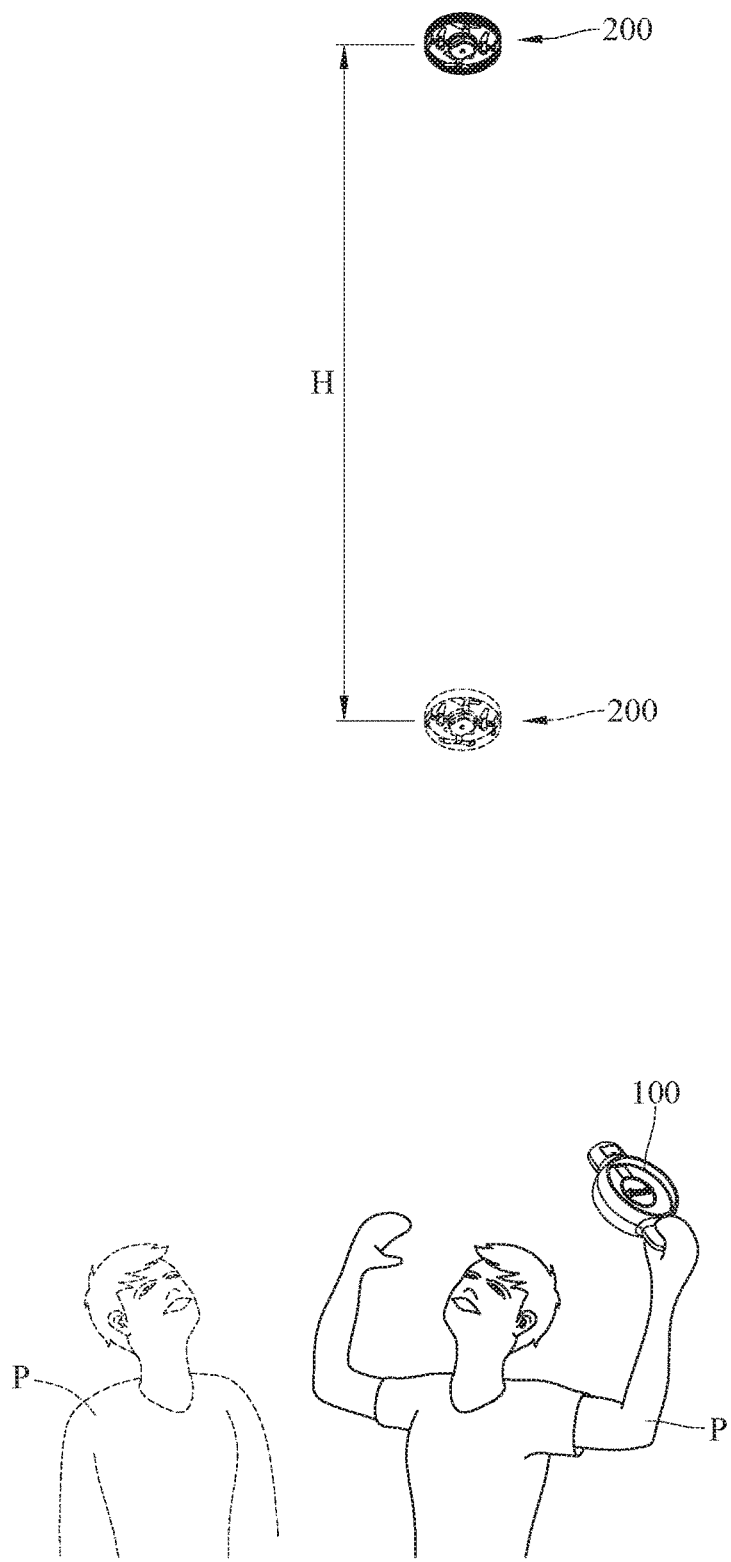

Please refer to FIG. 8 and FIG. 9. FIG. 8 and FIG. 9 are two scenarios that a user interacts with the detachable aerial photographic apparatus shown in FIG. 1. A user P is able to fly the aircraft 200 by following the aforementioned operation steps. The power of the aircraft 200 will turn off automatically after the aircraft 200 flies for a predetermined time, and then the aircraft 200 will land by itself. During the flight, the camera 230 disposed on the aircraft 200 starts taking photos. In this embodiment, the camera 230 takes photos at a first shooting time point (as shown in FIG. 8) and a second shooting time point (as shown in FIG. 9), and the first shooting time point is between the second time point and the second shooting time point. An altitude of the aircraft 200 at the second shooting time point (as shown in FIG. 9) is higher than an altitude of the aircraft 200 at the first shooting time point (as shown in FIG. 8), thus an altitude difference H (as shown in FIG. 9) is determined between the aircraft 200 at the first shooting time point and the second shooting time point. In other words, the camera 340 is able to take photos at low altitude and high altitude, providing various options for the user. It is understood that flying at a high altitude gives the camera 340 a broader range to take photos. For example, when the aircraft 200 is flying at a high altitude, the camera 340 would be able to take a group photo easier.

According to the detachable aerial photographic apparatus as discussed above, because of the configuration of the trigger and the take-off delaying device, the first time point when the propeller is triggered is earlier than the second time point when the stopper is detached from the aircraft, which allowing the aircraft to has sufficient time to accumulate enough energy for flying. As a result, it will become easier to operate the detachable aerial photographic apparatus, thereby making the aircraft to fly stably and the camera to take high quality photos easier.

Moreover, in some embodiments, the aircraft will automatically fly stably and land safely by simply pressing one button (e.g. the trigger), so that the operation is convenient for the user.

What is claimed is:

1. A detachable aerial photographic apparatus, comprising:
    a carrier;
    an aircraft, comprising a main body, at least one propeller and a camera, the quantity of the at least one propeller is plural, the main body disposed on the carrier, the plural propellers are pivotally furnished in the main body, and the camera is disposed on the main body;
    a take-off delaying device further comprising a movable member and at least one stopper, the movable member is movably disposed on the carrier, the at least one stopper is connected to the movable member, the at least one stopper is detachably connected to the aircraft for preventing the aircraft from taking off, and the movable member is configured for detaching the at least one stopper from the aircraft for releasing the aircraft; and
    a trigger, electrically connected to the aircraft and the take-off delaying device, the trigger configured for triggering the plural propellers and the movable member, a first time point when the plural propellers are triggered by the trigger is earlier than a second time point when the at least one stopper is detached from the aircraft.

2. The detachable aerial photographic apparatus according to claim 1, wherein the take-off delaying device further comprising a motor and at least one linkage, the movable member is pivotally disposed on the motor, two ends of the at least one linkage which are opposite to each other are pivoted to the movable member and the at least one stopper respectively, the trigger is electrically connected to the motor, when the motor rotates the movable member, the movable member drives the at least one linkage to move the at least one stopper to be alternatively closed to or away from the aircraft.

3. The detachable aerial photographic apparatus according to claim 2, wherein the main body has an annular surface and a recess, the recess is formed on the annular surface, the at least one stopper comprises a pivotal portion, a connecting portion and a protrusion, the pivotal portion and the protrusion are located on a side of the connecting portion, and the pivotal portion is pivoted to the at least one linkage.

4. The detachable aerial photographic apparatus according to claim 3, wherein the at least one linkage comprises a first linkage and a second linkage, the at least one stopper comprises a first stopper and a second stopper, two ends of the first linkage that are opposite to each other are respectively connected to the movable member and the first stopper, two ends of the second linkage that are opposite to each other are respectively connected to the movable member and the second stopper, when the motor rotates the movable member, the movable member drives the first linkage and the second linkage to move the first stopper and the second stopper to be alternatively close to or away from each other.

5. The detachable aerial photographic apparatus according to claim 4, wherein the take-off delaying device further comprises a first elastic member and a second elastic member, the first elastic member is compressed between the first stopper and the carrier, the second elastic member is compressed between the second stopper and the carrier, and the first elastic member and the second elastic member are configured for moving the first stopper and the second stopper to be close to each other.

6. The detachable aerial photographic apparatus according to claim 4, wherein the movable member has two pivot grooves respectively located at two sides of the movable member that are opposite to each other, each of the first stopper and the second stopper has a pivot groove, each of the first linkage and the second linkage has two pivoting protrusions, the two pivoting protrusions of the first linkage are respectively located at two sides of the first linkage that are opposite to each other, the two pivoting protrusions of the second linkage are respectively located at two sides of the second linkage that are opposite to each other, the two pivoting protrusions of the first linkage are respectively pivoted on the pivot groove of the first stopper and one of the two pivot grooves of the movable member, and the two pivoting protrusions of the second linkage are respectively pivoted on the pivot groove of the second stopper and the other one of the two pivot grooves of the movable member.

7. The detachable aerial photographic apparatus according to claim 6, wherein two central axes of the two pivot grooves are spaced apart from a central axis of the movable member.

8. The detachable aerial photographic apparatus according to claim 3, wherein the protrusion of the at least one stopper protrudes into the recess of the aircraft to a depth, a rotational speed of the motor is proportional to a rate of change in the depth, the trigger is configured for triggering the aircraft and the take-off delaying device simultaneously, and a time difference between the first time point and the second time point is controlled by the rotational speed of the motor.

9. The detachable aerial photographic apparatus according to claim 3, wherein the protrusion of the at least one stopper protrude into the recess of the aircraft to a depth, a rotational speed of the motor has is proportional to a rate of change in the depth, the trigger being for firstly triggering the aircraft at a first starting time point, and then triggering the take-off delaying device at a second starting time point, a time difference between the first time point and the second time point is controlled by the rotational speed of the motor and a time difference between the first starting time point and the second starting time point.

10. The detachable aerial photographic apparatus according to claim 1, wherein the trigger comprises a first switch, a second switch and at least one pressed member, the first switch is electrically connected to the aircraft, the second switch is electrically connected to the take-off delaying device, the at least one pressed member has a first pressed protrusion and at least one second pressed protrusion, the at least one pressed member is slidably disposed on the carrier, and the first pressed protrusion and the at least one second pressed protrusion move toward and press the first switch and the second switch, respectively.

11. The detachable aerial photographic apparatus according to claim 10, wherein the first switch and the aircraft are electrically connected to each other through a wired connection or a wireless connection.

12. The detachable aerial photographic apparatus according to claim 1, further comprising a display module disposed on the carrier.

13. The detachable aerial photographic apparatus according to claim 12, further comprising a computing module disposed in the carrier and electrically connected to the display module, and the computing module having an operating system.

14. The detachable aerial photographic apparatus according to claim 13, further comprising a Bluetooth module disposed in the carrier and electrically connected to the computing module.

15. The detachable aerial photographic apparatus according to claim 1, wherein the aircraft further comprises a buffering ring connected to the main body, and the buffering ring surrounding the main body.

16. The detachable aerial photographic apparatus according to claim 1, wherein the camera is for taking photos at a first shooting time point and a second shooting time point, the first shooting time point is between the second time point and the second shooting time point, and an altitude of the aircraft at the first shooting time point is different from the altitude of the aircraft at the second shooting time point.

17. The detachable aerial photographic apparatus according to claim 1, wherein the carrier has a game card slot configured for a game card to plug in.

18. The detachable aerial photographic apparatus according to claim 1, wherein the aircraft are detachably disposed on the carrier, when the aircraft is detached from the carrier, the carrier is configured for playing video game.

19. The detachable aerial photographic apparatus according to claim 1, wherein the at least one stopper is configured for fastening the aircraft to prevent the aircraft from taking off.

* * * * *